United States Patent Office 3,534,031
Patented Oct. 13, 1970

3,534,031
ACETOXYMETHYL ACETAMIDES AND ACETAMIDOACETAMIDES AND THEIR PREPARATION
Stanley C. Bell, Penn Valley, Ronald J. McCaully, Malvern, and Scott J. Childress, Philadelphia, Pa., assignors to American Home Products Corporation, New York, N.Y., a corporation of Delaware
No Drawing. Original application May 17, 1965, Ser. No. 456,533, now Patent No. 3,382,243, dated May 7, 1968. Divided and this application Oct. 23, 1967, Ser. No. 677,029
Int. Cl. C07c 103/50; C07d 87/16
U.S. Cl. 260—244                                   5 Claims

ABSTRACT OF THE DISCLOSURE

A process is disclosed in which an N[(4-oxo-4H-3,1-benzoxazin-2-yl)acyloxymethyl] lower fatty acid amide is prepared by a reaction of an acid anhydride with a substituted aminoacetyl anthranilic acid. The reaction product is then treated with a compound possessing an active hydrogen and a nucleophilic group, i.e., an amine, whereby there is formed a 2 - carbamyl-acetanilide in which one nucleophilic group attaches to the methylene radical of the acetyl group and another to the carbonyl group of the acetanilide. The compounds of the invention are central nervous system depressants, resulting in a generally relaxing or sedative effect.

---

This application is a division of application Ser. No. 456,533, filed May 17, 1965, which issued on May 7, 1968 as U.S. Pat. 3,382,243.

This invention relates to novel substituted 2-acylamino acetamides, the intermediates for preparing them, and particularly the process for the manufacture and the use thereof.

The process of the invention involves the concept of treating an N-hydroxyamino or N-acyloxy-N-acyl-amino acetyl anthranilic acid with a lower fatty acid anhydride, for example, acetic anhydride, that forms an N[(4-oxo-4H - 3,1-benzoxazin-2-yl)acetoxymethyl] acetamide. The latter is treated with a compound possessing at least one reactive hydrogen atom combined with a nucleophilic group, whereby the latter, suprisingly causes ring rupture to form a 2-carbamylacetanilide by attaching as a substituent to the alpha carbon of the acetyl nucleus, and also attaches to the 2-carbonyl group on the benzene ring.

One method for preparing the novel acetamides and intermediates may be illustrated in the following specific sequence of reaction steps:

In the above series of reactions, the starting material is prepared by reacting anthranilic acid with chloracetyl chloride under known conditions, forming the expected chloroacetamide. The chlorine is then displaced with iodine, also under known conditions, to form the corresponding iodoacetamide shown as Compound IV.

The isolated iodoacetamide is now reacted as (1) to form an hydroxyamino acetamide (Compound V). This is carried out under carefully controlled reaction conditions utilizing hydroxylamine, preferably as the hydrochloride or sulfuric acid salt, in an alcoholic solvent, preferably ethanol. The reaction media must have sufficient basicity to yield free hydroxylamine and, therefore, enough base is added to give a stoichiometric excess of hydroxylamine. A pH from about neutrality to pH 9 will permit the reaction to proceed satisfactorily. A reaction temperature from about 50° C. to 100° C., preferably from about 70° C. to 80° C. has been found effective.

The hydroxyaminoacetyl anthranilic acid is treated (Reaction 2) with a lower fatty acid anhydride, represented by $(R^3CO)_2O$ in which $R^3$ represents a lower alkyl, preferably methyl, under relatively mild conditions at about 50° C. to 100° C. but preferable steam bath temperature to form the benzoxazine, an N-[(4 - oxo-4H-3,1-benzoxazine - 2 - yl)acyloxymethyl] lower fatty acid amide, represented as Compound VIII.

The novel benzoxazine is then reacted with a compound having an active hydrogen and a nucleophilic group as previously mentioned, which is represented as BH, the symbol B standing for a nucleophilic group such as an amino, a substituted amino, a morpholino, a lactam anion, a sulfonamide anion, a substituted oxy or a substituted mercapto group. Thus, the nucleophilic reactant represented as BH, is intended to cover ammonia; a mono- or di-substituted amine, the substituent or substituents being lower alkyl or aralkyl radicals; or morpholine.

The final Reaction 3 is carried out by reacting the acyloxyacylamino compound with a solution of the nucleophilic reactant, the desired reaction taking place at a temperature within 0° to 150° C., and preferably within the range of 20° to 80° C. Solvents useful in the reaction may be the lower aliphatic alcohols, the lower alkyl ethers, diethyl ether, dioxane or other inert solvents in which the reactants are soluble. The reaction should take place under basic conditions, which may be realized by the characteristics of the nucleophilic reagent itself. Where the latter is weakly basic or is essentially unreactive as a base, as in the case of a lower alkanol, it is necessary to add a strongly basic material, for example, sodium hydroxide to cause the reaction to proceed in the desired direction. An

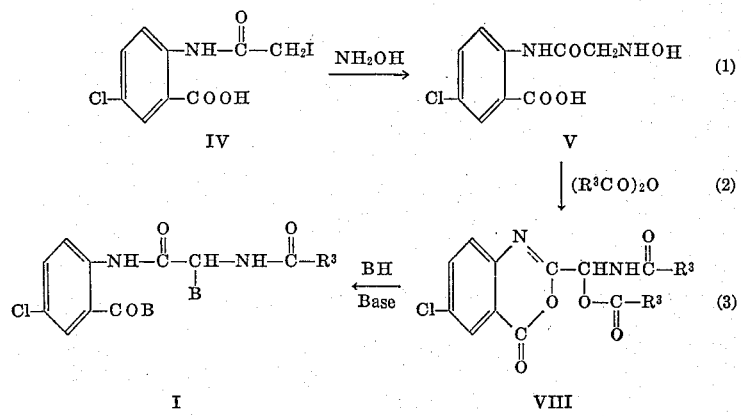

amount of base in excess of the stoichiometric amount is desirable.

The bicyclic Compound VIII may be made by another route which is illustrated specifically as follows:

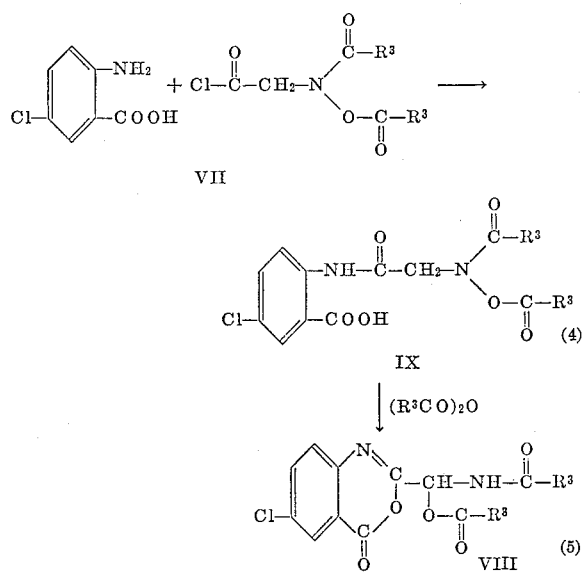

In the latter reaction sequence, where R³ has the meaning previously indicated, Compound VII may first be prepared by reacting hydroxyaminoacetic acid with a selected lower fatty acid anhydride for the initial acylation reaction, after which one adds thionyl chloride. The minimum amount of anhydride necessary for complete reaction is used and the reaction is carried out at a temperature ranging from about 20° to 80° C. The temperature of reaction has been found to be critical and a temperature of about 60° to 70° C. will result in optimum yields. In place of the acid anhydride, one may use an acyl halide. Also, in place of thionyl chloride, which is preferred, one may use phosphorus pentachloride, or bromide.

The amination reaction with the halogenated anthranilic acid, identified as Reaction 4, is carried out at approximately room temperature, or, if necessary, at a temperature up to the refluxing temperature of the reaction mixture. This reaction replaces the reactive chlorine atom with the selected group of the anthranilic acid to form the desired acetamide represented as Compound IX.

In Reaction 5 the use of an acid anhydride or its equivalent also causes ring closure with the elimination of the acyloxy group and the attachment of an acyloxy group acting as a nucleophile to the methylene carbon. The reaction is carried out essentially as in the case of Reaction 2 preferably heating Compound IX with the acid anhydride on a steam bath, which results in the aforesaid benzoxazine, represented as Compound VIII.

The novel acetamides obtained in the final reactions with the nucleophilic compound, represented by Formula I, are pharmacologically active and deemed useful as central nervous system depressants, resulting in a generally relaxing or sedative effect. This was demonstrated by tests with mammals (mice) carried out by acceptable pharmacological procedures. In such procedures, standard graduated doses are used, normally up to 400 mg./kg. In this present case clearly observable decreased motor activity was noted in the neighborhood of about 100 mg./kg. when the test compound was injected parenterally (IP).

The above mentioned final compounds may be characterized as generally white solids having relatively high melting points and crystallizable out of ethyl alcohol. They are substantially water-insoluble but soluble in the common polar solvents. When acid-addition salts can be formed, the latter are then water-soluble to a material degree. The structural configuration of the compounds was determined by the reactants used and confirmed by known measurement procedures including infra-red analysis and determination of the nuclear magnetic resonance spectrum.

The following examples illustrate the various features of the invention in greater detail. Temperatures as given are to be understood as being in degrees centigrade.

EXAMPLE 1

2-iodoacetamido-5-chlorobenzoic acid, M.P. 186–188° is prepared from 2-chloroacetamido-5-chlorobenzoic acid and a molar excess of sodium iodide in 200 ml. of acetone, refluxed for 3 hours, cooled and diluted with water. The resultant precipitate was recrystallized from ethanol.

Analysis.—Calcd. for $C_9H_7ClINO$ (percent): N, 4.12; Cl, 10.44; I, 37.38. Found: (percent) N, 4.38; Cl, 10.40; I, 37.4.

EXAMPLE 2

2-chloroacetamido-5-chlorobenzoic acid, was prepared from 40 g. of 5-chloroanthranilic acid and 34 g. of chloroacetylchloride and the product, M.P. 214–217°, was recrystallized from a water-alcohol mixture.

Analysis.—Calcd. for $C_9H_7Cl_2NO_3$ (percent): C, 43.56; H, 2.84; N, 5.64; Cl, 28.58. Found (percent): C, 44.02; H, 3.08; N, 5.59; Cl, 28.40.

EXAMPLE 3

5-chloro-N-(hydroxyaminoacetyl) anthranilic acid.—To a solution of 136 g. of 2-iodoacetamido-5-chlorobenzoic acid in 800 ml. of ethanol, warmed to 75°, was added a solution of 88 g. of hydroxylamine hydrochloride in 400 cc. of 4 N sodium hydroxide solution. The solution was heated at 80° for 10 min., chilled, and diluted with 1 l. of water to obtain the title product.

Analysis.—Calcd. for $C_9H_9ClN_2O_4$ (percent): C, 44.3; H, 3.7; Cl, 14.5. Found (percent): C, 44.58; H, 3.78; Cl, 14.35.

EXAMPLE 4

N - ([acetyl(acetoxy)amino]acetyl)-5-chloroanthranilic acid.—A mixture of 2.0 g. of hydroxyaminoacetic acid was heated in 30 ml. of acetic anhydride with stirring for 20 min. at 60°. The excess acetic anhydride was removed in vacuo and the residue dissolved in 20 ml. of methylene chloride and 6 ml. of thionyl chloride and refluxed for 5 min. The solvent was removed in vacuo and the residue was dissolved in 30 ml. of methylene chloride and added to 7 g. of 5-chloro-anthranilic acid in 60 ml. of 1,2-dimethoxyethane. The insoluble hydrochloride salt of the starting amine was filtered from the reaction mixture. The filtrate was concentrated to dryness and the residue recrystallized from ethanol giving the product, M.P. 182–183°.

Analysis.—Calcd. for $C_{13}H_{13}ClN_2O_6$ (percent): C, 47.50; H, 3.98; N, 8.52; Cl, 10.78. Found (percent): C, 47.72; H, 4.13; N, 8.37; Cl, 10.7.

EXAMPLE 5

N - ([acetyl(acetoxy)amino]acetyl) anthranilic acid, methyl ester, M.P. 94–96°, is prepared from methyl anthranilate, hydroxyaminoacetic acid and acetic anhydride according to the procedure of Example 4.

Analysis.—Calcd. for $C_{14}H_{16}N_2O_6$ (percent): C, 54.54; H, 5.23; N, 9.09. Found (percent): C, 54.69; H, 5.18; N, 8.96.

EXAMPLE 6

N-[(6-chloro-4-oxo-4H - 3,1 - benzoxazin-2-yl)acetoxy methyl]acetamide.—A solution of 3.6 g. of 5′-chloro-2-hydroxyaminoacetylanthranilic acid and 50 ml. of acetic anhydride was heated for 1 hour on the steam bath and partially concentrated. White crystals, 2.1 g. M.P. 208–210° dec., were obtained on cooling.

*Analysis.*—Calcd. for $C_{13}H_{11}ClN_2O_5$ (percent): C, 50.25; H, 3.56; N, 9.02; Cl, 11.41. Found (percent): C, 50.32; H, 3.52; N, 8.85; Cl, 11.40.

EXAMPLE 7

2 - acetamido - 4' - chloro-2-(methylamino)-2'-methyl-carbamoylacetanilide, M.P. 186–189°. A mixture of N[(6-chloro-4-oxo-4H - 3,1 - benzoxazine-2-yl)acetoxymethyl] acetamide in ethanol was added dropwise to a solution of methylamine reactant in absolute ethanol. The solution was heated to 70° C. for one hour. The solvent and excess reactant were removed and the residue was crystallized from ethanol-water.

*Analysis.*—Calcd. for $C_{13}H_{17}ClN_4O_3$ (percent): C, 49.91; H, 5.49; N, 17.91; Cl, 11.34. Found: (percent): C, 49.76; H, 5.08; N, 18.34; Cl. 11.5.

The invention claimed is:

1. The process comprising reacting 5-chloro-N-(hydroxyaminoacetyl) anthranilic acid with acetic anhydride at about steam bath temperature and forming the compound N-[(6-chloro-4-oxo-4H-3,1-benzoxazin - 2 - yl)acetoxymethyl] acetamide.

2. The process of claim 1, wherein N-([acetyl(acetoxy) amino]acetyl)-5-chloroanthranilic acid is reacted with acetic anhydride.

3. A compound having the formula:

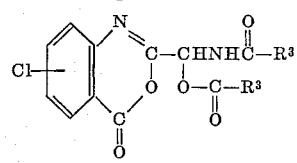

wherein $R^3$ is lower alkyl.

4. A compound of claim 3; wherein $R^3$ is methyl.

5. The compound, N-[(6-chloro-4-oxo-4H-3,1-benzoxazin-2-yl)acetoxymethyl]acetamide.

References Cited

UNITED STATES PATENTS

| 3,105,071 | 9/1963 | Moffett | 260—244 |
| 3,249,605 | 5/1966 | Moffett | 260—244 |
| 3,255,189 | 6/1966 | Moffett | 260—244 |

NATALIE TROUSOF, Primary Examiner

U.S. Cl. X.R.

260—247.2, 518 519, 545, 558; 424—324